United States Patent
Tabet et al.

(10) Patent No.: US 10,057,823 B2
(45) Date of Patent: Aug. 21, 2018

(54) PACKET-SWITCHED WIRELESS COMMUNICATION FOR LINK BUDGET LIMITED WIRELESS DEVICES

(71) Applicant: Apple Inc., Cupertino, CA (US)

(72) Inventors: Tarik Tabet, Los Gatos, CA (US); Farouk Belghoul, Campbell, CA (US); Samy Khay-Ibbat, San Francisco, CA (US); Sarma V. Vangala, San Jose, CA (US); Rafael L. Rivera-Barreto, Santa Clara, CA (US); David Boettger, San Jose, CA (US); Awais M. Hussain, Milpitas, CA (US); Syed Aon Mujtaba, San Clara, CA (US)

(73) Assignee: Apple Inc., Cupertino, CA (US)

(*) Notice: Subject to any disclaimer, the term of this patent is extended or adjusted under 35 U.S.C. 154(b) by 63 days.

(21) Appl. No.: 15/153,676

(22) Filed: May 12, 2016

(65) Prior Publication Data

US 2016/0345217 A1    Nov. 24, 2016

Related U.S. Application Data

(60) Provisional application No. 62/163,340, filed on May 18, 2015.

(51) Int. Cl.
*H04W 36/00* (2009.01)
*H04W 36/30* (2009.01)
(Continued)

(52) U.S. Cl.
CPC ...... *H04W 36/0083* (2013.01); *H04B 17/336* (2015.01); *H04B 17/382* (2015.01)

(58) Field of Classification Search
CPC .................. H04W 36/0083; H04B 17/336; H04B 17/382
See application file for complete search history.

(56) References Cited

U.S. PATENT DOCUMENTS

2008/0108367 A1    5/2008   Afrashteh et al.
2013/0310060 A1    11/2011  Boudreau et al.
(Continued)

OTHER PUBLICATIONS

Office Action, German Application No. DE 10 2016 208 404.6, dated Feb. 7, 2018, 5 pages.

*Primary Examiner* — Brian D Nguyen
(74) *Attorney, Agent, or Firm* — Meyertons Hood Kivlin Kowert & Goetzel, P.C.; Jeffrey C. Hood; Joel L. Stevens (57) ABSTRACT

This disclosure relates to techniques for a link budget limited UE to improve communications performance with a cellular network. The UE may perform signal to interference noise ratio (SINR) measurements and use these measurements to adjust a received signal power value that is provided to the cellular network as a received signal power measurement. The UE may generate the received signal power value based at least in part on the SINR measurement in order to reduce the likelihood of handover when the UE has good SINR but poor received signal power. The UE may also provide preferred configuration information to the base station which enhances the performance of the UE when link budget limited. The configuration information may specify one or more parameter values designed to provide improved performance for a link budget limited device.

20 Claims, 6 Drawing Sheets

(51) Int. Cl.
*H04B 17/336* (2015.01)
*H04B 17/382* (2015.01)

(56) References Cited

U.S. PATENT DOCUMENTS

| | | |
|---|---|---|
| 2013/0165122 A1 | 6/2013 | Tanaka |
| 2014/0200001 A1 | 7/2014 | Song |
| 2014/0233408 A1 | 8/2014 | Bontu |
| 2014/0328327 A1* | 11/2014 | Xiao ................. H04W 36/0088 370/332 |
| 2014/0378145 A1 | 12/2014 | Legg |
| 2015/0072692 A1* | 3/2015 | Seki ................. H04W 52/0206 455/437 |
| 2015/0110027 A1* | 4/2015 | Lim ..................... H04L 1/1812 370/329 |
| 2015/0117407 A1* | 4/2015 | Hogan ................. H04W 52/12 370/331 |
| 2015/0126238 A1* | 5/2015 | Simonsson ........... H04W 52/36 455/522 |
| 2015/0271738 A1* | 9/2015 | Cheng ................. H04W 16/24 455/422.1 |
| 2016/0044551 A1* | 2/2016 | Frenger ............... H04B 7/0617 370/252 |
| 2016/0072598 A1* | 3/2016 | Jonsson ............... H04B 7/0413 455/67.11 |
| 2016/0127069 A1* | 5/2016 | Nuss .................... H04W 16/10 370/329 |

\* cited by examiner

PACKET-SWITCHED WIRELESS COMMUNICATION FOR LINK BUDGET LIMITED WIRELESS DEVICES

PRIORITY CLAIM

This application claims benefit of priority of U.S. Provisional Patent Application Ser. No. 62/163,340 titled "Improved Packet-Switched Wireless Communication for Link Budget Limited Wireless Devices," filed May 18, 2015, which is hereby incorporated by reference as though fully and completely set forth herein.

FIELD

The present application relates to wireless devices, and more particularly to an apparatus, system, and method for providing improved packet-switched communication procedures for link budget limited wireless devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link budget limited" devices.

SUMMARY

Embodiments are presented herein of methods for providing improved packet-switched wireless communication performance for link budget limited devices, and of devices (e.g., wireless devices (UEs), base stations) configured to implement the methods. For example, embodiments presented herein may provide improved LTE or LTE-Advanced performance for link budget limited devices. Some embodiments may relate to a user equipment (UE) that comprises at least one antenna, at least one radio, and a processing element, and which is configured to perform a subset or all of the operations described herein.

According to techniques described herein, the UE (which may be link budget limited) may connect to a base station in a first cell in a cellular network and may perform a measurement of signal to interference noise ratio (SINR) of communications received by the UE in the first cell (e.g., may perform an SINR measurement). The UE may then generate a received signal power value based at least in part on the SINR measurement and communicate this generated received signal power value to the base station as a received signal power measurement. The UE may generate the received signal power value based at least in part on the SINR measurement in order to reduce the likelihood of handover when the UE has good SINR but poor received signal power. The generated received signal power value may be used by the base station in determining when a handover of the UE should occur from the first cell to a second cell.

In some embodiments, the UE may perform an actual measurement of received signal power (e.g., an RSRP and/or RSRQ measurement) from the base station to produce a first received signal power value. The UE may then adjust the first received signal power value based on the SINR measurement to produce a second different received signal power value, for example by adding an offset that corresponds to an amount of the SINR measurement. The UE may then report this second received signal power value to the network as the received signal power measurement. In another embodiment, the UE may comprise a memory which stores a data structure mapping SINR measurements to received signal power values. Here, the UE may generate the received signal power value by mapping an actual SINR measurement to a corresponding (artificially generated) received signal power value using the data structure.

The UE may be configured to communicate with the cellular network according to a first cellular radio access technology (RAT), wherein the first RAT specifies that the UE report a received signal power measurement to the cellular network for use in determining whether to handover the UE from the first cell to a second cell. However, for a link budget limited device, a report of measured received signal power may not provide an accurate indication of when a handover should occur. Thus instead the UE may perform a different type of measurement, such as SINR, and may generate/report a received signal power value that is based at least in part on this SINR measurement.

According to further techniques described herein, the UE (which may be link budget limited) may wirelessly connect to a base station in a first cell in a cellular network and provide configuration information to the base station. The configuration information may specify one or more parameter values designed to provide improved performance for a link budget limited device, wherein the one or more parameter values are usable to configure the cellular network and/or the UE. The cellular network may receive this configuration information and may determine to configure itself and/or the UE accordingly. The UE may then receive a communication from the base station specifying usage of the one or more parameter values, and the UE may configure itself according to these parameter values in response. After being configured, the UE operates with improved performance when link budget limited.

The configuration information may comprise a plurality of parameter values. Alternatively, the configuration information may comprise an index value that is usable by the cellular network to identify a set of parameter values pre-stored in the cellular network. The index value may be a first index value of a plurality of possible index values, wherein each of the plurality of possible index values specifies or maps to a respective set of parameter values that are usable to configure the UE.

In some embodiments, the UE is configured to communicate according to a first radio access technology (RAT), wherein the RAT conforms to a RAT standard. The one or more parameters may specify one or more different values for parameters which do not conform to the RAT standard. For example, the RAT standard may specify a first period of time for the UE to perform a first action, and the one or more parameter values may comprise at least one timer value which increases the first period of time to a larger second period of time in which the UE is allowed to perform the first action.

The following are various examples of timers which may be modified from the prescribed values specified in the standard. For example, various timer values may be increased (allowing for an increased amount of time) relative to the RAT standard, or may be reduced (allowing for a decreased amount of time) relative to the RAT standard. The one or more parameter values may comprise one or more of the following: 1) a handover failure timer value, which provides an increased amount of time after which a handover failure is deemed to have occurred, wherein the handover failure timer value is larger than that specified in the RAT standard; 2) a time-to-trigger timer value, which provides an increased amount of time for measurement reporting, wherein the time-to-trigger timer value is larger than that specified in the RAT standard; 3) a handover preparation timer value, which provides an increased amount of time for handover preparation, wherein the handover preparation timer value is larger than that specified in the RAT standard; 4) a radio link failure timer value, which provides an increased amount of time before a radio link failure procedure is invoked, wherein the radio link failure timer value is larger than that specified in the RAT standard; 5) a packet discard timer value, which provides an increased amount of time before a packet is discarded from a buffer, wherein the packet discard timer value is larger than that specified in the RAT standard; 6) a first radio link failure timer value, which provides an increased amount of time before triggering a radio link failure procedure, wherein the first radio link failure timer value is larger than that specified in the RAT standard; and 7) a second radio link failure timer value, which provides a reduced amount of time before stopping a radio link failure procedure, wherein the second radio link failure timer value is smaller than that specified in the RAT standard.

The one or more parameter values may also specify other changes from the RAT standard. For example, the one or more parameter values may comprise: 1) a first value that specifies an increased maximum signal strength measurement of a neighboring cell relative to a threshold for handover management, wherein the first value is different than that specified in the RAT standard; 2) a first value that specifies an increased maximum number of radio link control retransmissions to avoid radio link failure, wherein the first value is different than that specified in the RAT standard; 3) a first value that specifies a lower periodicity of channel quality reporting than that specified in the RAT standard; 4) a first value that specifies a reduced number of maximum scheduling request attempts than that specified in the RAT standard; 5) a first value that specifies an increased number of random access channel attempts than that specified in the RAT standard; 6) a first value that specifies an increased amount of delay in performance of an out of service procedure than that specified in the RAT standard; and 7) a handover event value that specifies a signal strength measurement of a neighboring cell relative to a threshold for handover management.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, figures, and claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
UMTS: Universal Mobile Telecommunication System
EUTRA: Evolved UMTS Terrestrial Radio Access
GSM: Global System for Mobile Communications
LTE: Long Term Evolution
PLMN: Public Land Mobile Network
CQI: Channel Quality Indicator
QCI: Quality of Service Class Identifier
GBR: Guaranteed Bit Rate
RAT: Radio Access Technology
RRC: Radio Resource Control
RSRP: Reference Signal Received Power
RSRQ: Reference Signal Received Quality
RX: Receive
RLC: Radio Link Control RLF: Radio Link Failure
TX: Transmit
UE: User Equipment
UMTS: Universal Mobile Telecommunications System Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
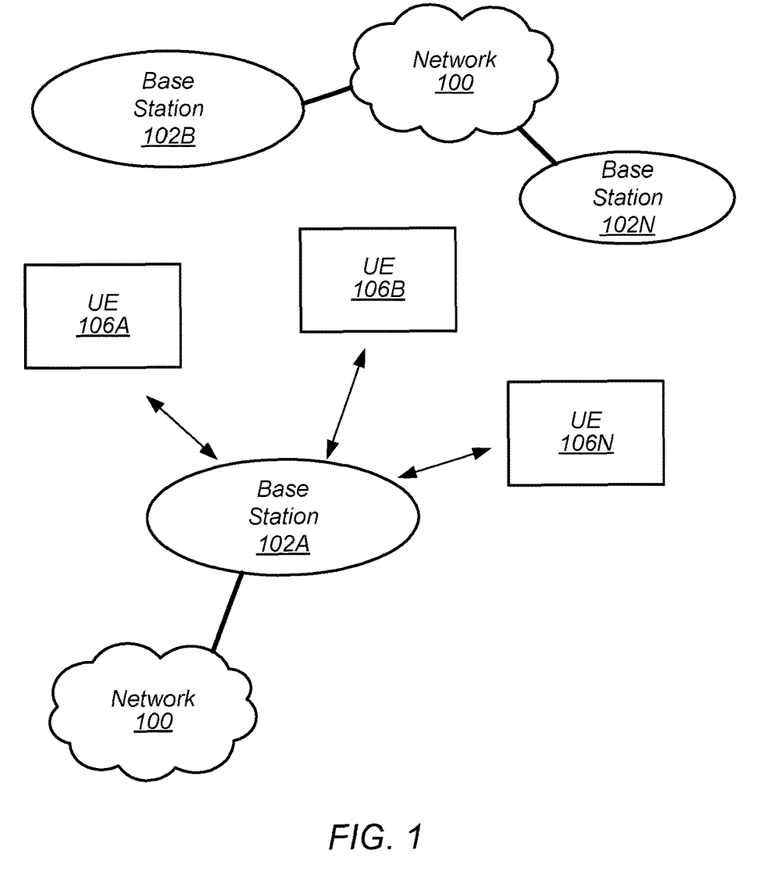
FIG. 1 illustrates an exemplary (and simplified) wireless communication system, according to some embodiments.
Figure 2:
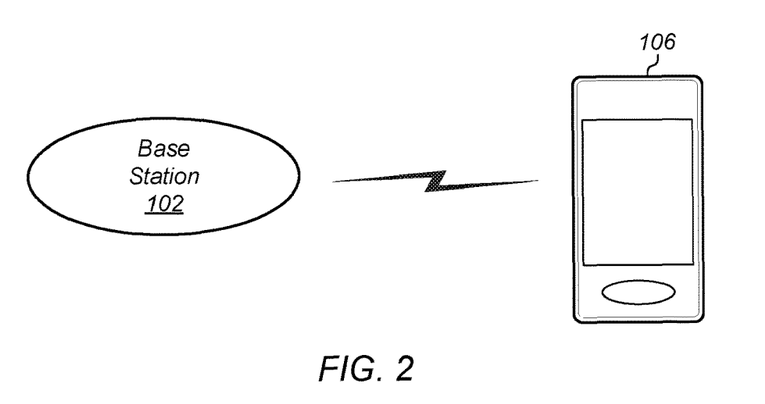
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
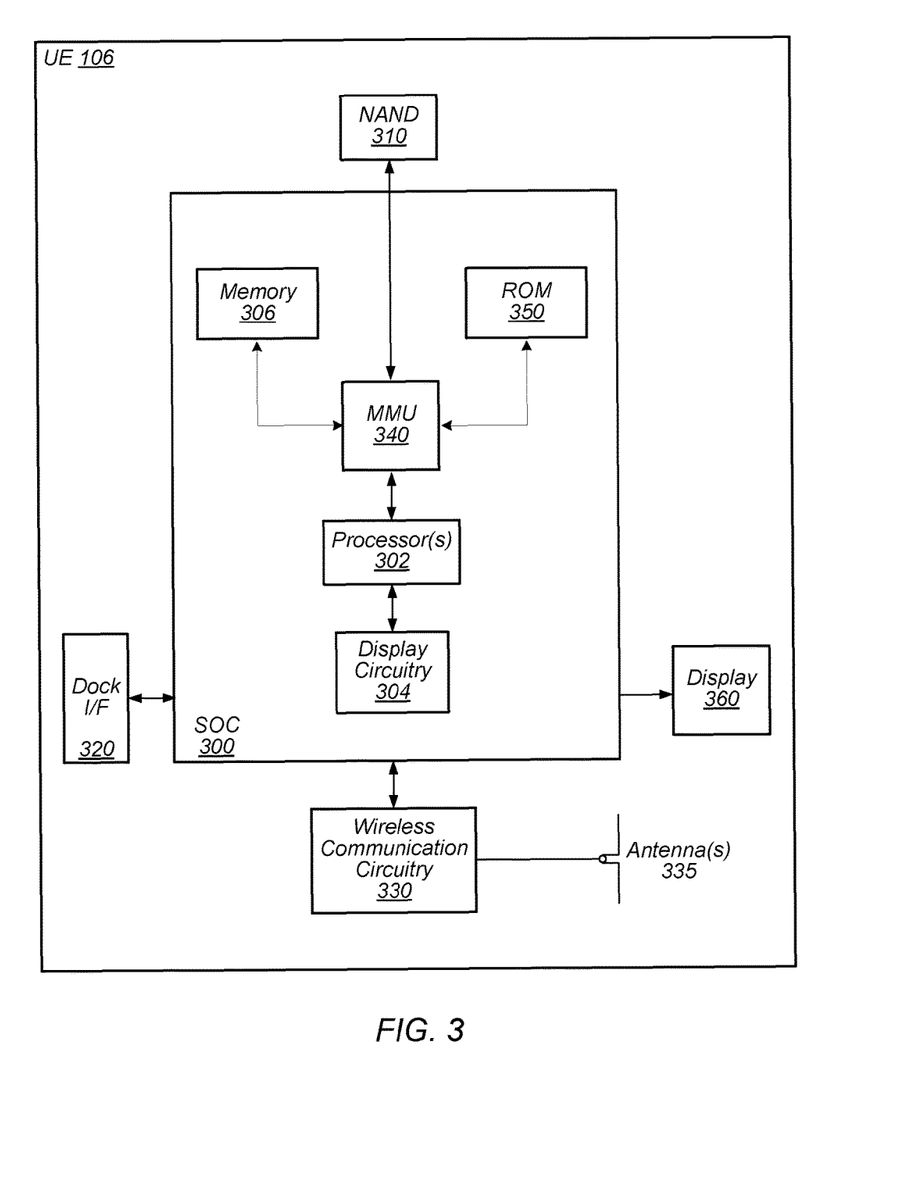
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 5 and/or 6.

Figure 4:
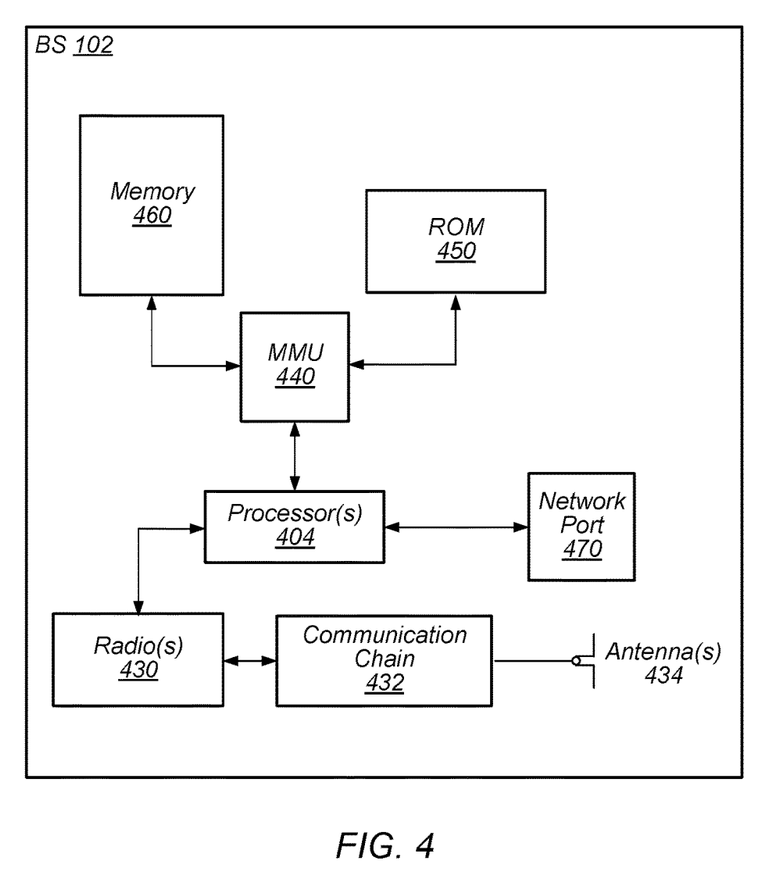
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Figure 5:
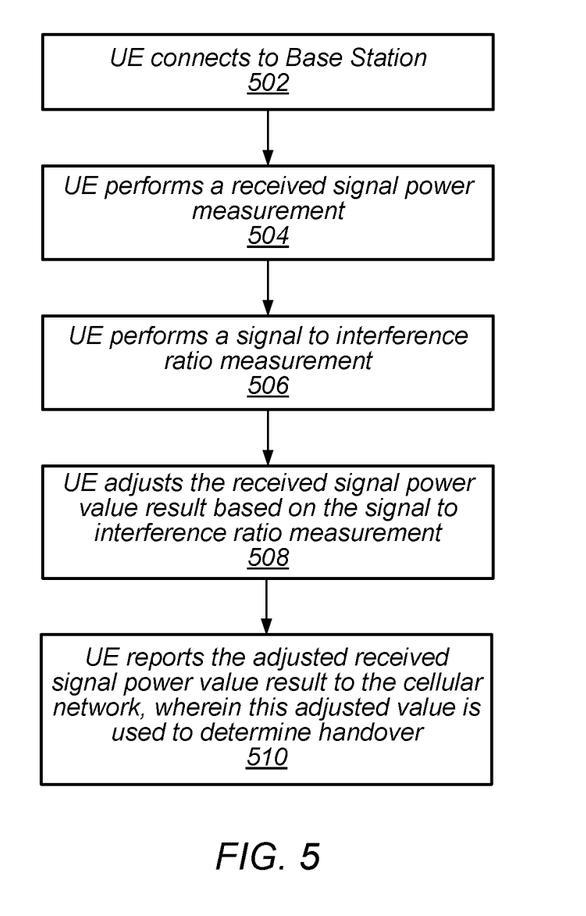
FIG. 5 is a flowchart diagram illustrating a method to perform handover and cell reselection in a cellular network adapted for a link budget limited UE, according to some embodiments.
Figure 6:
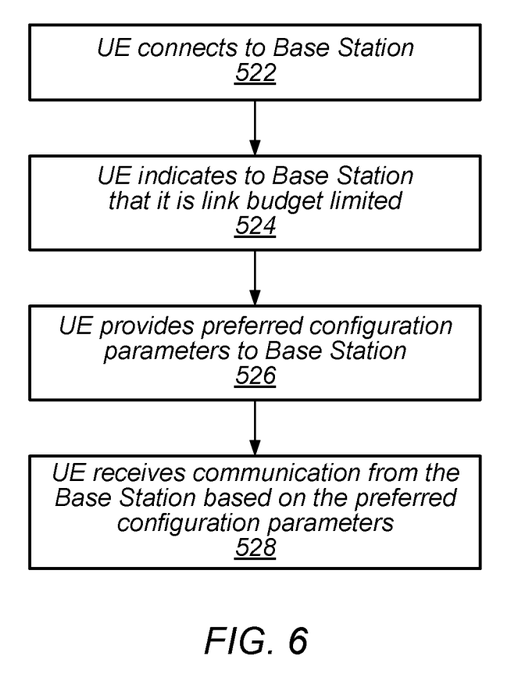
FIG. 6 is a flowchart diagram illustrating a method for a link budget limited UE to modify communication parameters in a cellular network, according to some embodiments.

The base station 102 may include hardware and software components for implementing or supporting implementation of features described herein, such as those described herein with reference to, inter alia, FIGS. 5 and 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein, such as the features described herein with reference to, inter alia, FIGS. 5 and 6.

Handover and Cell Reselection

Handover (HO) and cell reselection may occur at the edge of a cell in a cellular network. In some radio access technologies (RATs), a measurement of "received signal power" is used by the cellular network to determine whether to perform a handover. For example, the cellular network may perform a handover when one or both of Reference Signal Received Power/Reference Signal Received Quality (RSRP/RSRQ) measurements are below a certain threshold.

In the case of a link budget limited device, which may have reduced capabilities as compared to other mobile communication devices conforming to the RAT standard, including, for example, an antenna deficiency, the received signal power measurement might not be a good indication of the quality of service, and hence might not serve as a good criterion in determining whether the link budget limited device should undergo a handover. Thus, a link budget limited UE may benefit from a modification of the criteria used in handover and cell reselection, as discussed below in reference to FIG. 5. It is noted that the various operations described herein for link budget limited devices also applies to power limited UE devices, where the term "link budget limited" includes or encompasses power limited devices.

Some embodiments described herein relate to a link budget limited UE that may use different (or modified) criteria than that specified in the RAT standard in determining handover and cell reselection At a cell edge, the UE may most likely be interference limited, i.e., the signal and the interference may both be attenuated. In this case, even if the measured received signal power (e.g., RSRP) is very low, another channel quality measurement, such as the Signal to Interference plus Noise Ratio (SINR) (the ratio of signal and interference) may still be good. The RSRP may be low because it is a direct measurement of the received signal alone, and the received signal power may be poor because the UE is at cell edge and the UE is otherwise link budget limited (e.g., its antenna is relatively deficient). However, the SINR may indicate a usable or suitable wireless channel because both the signal strength and the amount of interference are both similarly limited, and thus the SINR ratio is fine. In this case, the UE may still be able to decode most downlink channels. Typically, in current systems, a cell reselection or handover may be triggered if the RSRP is below −120 dBm. However, for an antenna deficient UE measuring an RSRP at that level, the measured SINR may still be higher than 0 dB, indicating that the UE is still able to successfully decode its DL channels.

FIG. 5—Flowchart

FIG. 5 is a flowchart diagram illustrating a method to perform handover and cell reselection in a cellular network adapted for a link budget limited UE, according to some embodiments. While elements of the method of FIG. 5 are described substantially with reference to the LTE wireless communication technology, part or all of the method may be used in conjunction with other wireless communication technologies, as desired.

The method shown in FIG. 5 may be used in conjunction with any of the computer systems or devices shown in the above FIGS. 1-4, among other devices. In various embodiments, some of the elements of the scheme shown may be performed concurrently, in a different order than shown, or may be omitted. Additional elements may also be performed as desired. As shown, the scheme may operate as follows.

In 502, a link budget limited UE (e.g., UE 106) connects to a base station (e.g., base station 102) in a cellular network. The cellular network may conform to a radio access technology (RAT) standard, e.g., a packet-switched standard such as LTE or LTE-A. The cellular network may prescribe that a certain metric, such as received signal power, be measured by the UE and provided to the cellular network, where the cellular network uses this measured received signal power in assessing whether handover should be performed. However, as noted above, received signal power may not be the best metric in determining whether handover should occur for a link budget limited device.

In 504, the UE performs a received signal power measurement (e.g., RSRP and/or RSRQ), in which the UE measures the average power of resource elements that carry cell-specific resource signals over the considered measurement frequency bandwidth. In this way, the UE measures the signal strength from a specific base station.

In 506, the UE performs a separate signal measurement, such as a signal to interference ratio measurement (e.g., a Signal to Interference plus Noise Ratio or SINR), in which the UE measures the power of the signal of interest divided by the sum of the interference power and the background noise power. The UE may perform other types of measurements, e.g., other ratio based measurements, which are more suitable to determining the channel quality of a link budget limited device.

In 508, the UE uses the signal to interference ratio measurement to adjust the received signal power measurement. For example, the UE may apply (add) an offset to the received signal power measurement (the RSRP/RSRQ), wherein the amount of the offset is based on the measured SINR measurement in 506.

For example, the measurement of received signal power in 504 may produce a first received signal power value, and the UE may adjust the first received signal power value based on the SINR measurement in 506 to produce a second different received signal power value. In adjusting the first received signal power value based on the SINR measurement, the UE may be configured to add an offset to the first received signal power value to produce the second received signal power value. The amount of the offset may correspond, either in a linear or non-linear fashion, to the amount of the SINR measurement. For example, when the SINR measurement is larger, the UE may be configured to report a correspondingly larger second received signal power value as the received signal power measurement.

In 510 the UE may report the adjusted received signal power measurement (the second received signal power value) to the cellular network. This reported measurement is then used to determine whether handover should occur. Thus, the received signal power value that the UE reports to the cellular network is not the actual value that was measured by the UE, but rather is a different value—a value that was produced by modifying the actual received signal power measurement.

Thus, in some embodiments, the cellular network may use SINR as a metric to trigger cell reselection or handover, instead of, or supplemental to, RSRP. The threshold value of SINR used by the UE for triggering cell reselection or handover may be the value (the amount of SINR) needed by the UE to decode basic control channels like System Information Blocks (SIBs), the Physical Downlink Control Channel (PDCCH), etc. As described above, the UE may add an offset value to its RSRP/RSRQ measurements based on the SINR value that it observes or measures. For example, a link budget limited UE may measure the RSRP at −125 dBm and the SINR at 6 dB. The RAT may be such that a UE that reports a RSRP measurement below −120 dBm triggers cell reselection or handover. However, because the SINR value indicates the UE is still able to successfully decode its DL channels, the UE may add an offset value to its RSRP measurement based on the SINR value, thus reporting a higher RSRP measurement value than what was actually measured. For example, the UE may report a RSRP measurement of −110 dBm, adding an offset of 10 dBm based on the measured SINR value. The UE may then report the modified RSRP measurement (e.g., here, −110 dBm) to avoid triggering handover.

In some embodiments, even though the UE is required to report a "received signal power measurement" to the cellular network for the purpose of handover management, the UE may not actually perform a received signal power measurement in some instances. In these embodiments, the UE may comprise a memory that stores a data structure mapping SINR measurements to received signal power values, and the UE generates a received signal power value by mapping an actual SINR measurement to a corresponding received signal power value using the data structure. Thus, the received signal power value reported to the cellular network was not measured by the UE (and in fact no received signal power measurement was performed in this time period), but rather a received signal power value is artificially determined by mapping an actual SINR measurement to the received signal power value. Thus here, the received signal power value is derived from the data structure, was not actually measured, and was not measured and modified as described above.

Call Flows for Link Budget Limited Devices

In some packet-switched wireless communication protocols, such as LTE, a UE may need to operate through different call flows in order to establish a connection to the network and to maintain the connection. Different mechanisms may exist in the packet-switched wireless communication protocol or RAT (e.g., LTE) specification to ensure these call flows operate correctly. Also, recovery mechanisms may exist in case of failure. However, these mechanisms may not be optimized for a UE that is link budget limited. For example, timelines of such procedures may severely impact the operation of the battery. In addition, parameters of such procedures may not be optimized for link budget limited devices. Therefore, improvements in the field are desired.

FIG. 6—Flowchart

FIG. 6 is a flowchart diagram illustrating a method for a link budget limited UE to modify communication parameters in a cellular network, according to some embodiments. Note that while elements of the method of FIG. 6 are described substantially with reference to the LTE wireless communication technology, part or all of the method may be used in conjunction with other wireless communication technologies, as desired.

The method shown in FIG. 6 may be used in conjunction with any of the computer systems or devices shown in the above figures, among other devices. In various embodiments, some of the elements of the scheme shown may be performed concurrently, in a different order than shown, or may be omitted. Additional elements may also be performed as desired. As shown, the scheme may operate as follows.

In 522, the link budget limited UE 106 communicates with a base station (for example, base station 102A) of a cellular network to establish a connection with that base station for the provision of coverage in the cellular network.

In 524, the UE 106 indicates to the base station 102A that it is a link budget limited device. For example, the UE may provide a parameter value during radio resource control (RRC) messaging indicating that the UE is link budget limited. The cellular network may receive this value and adjust the manner in which the cellular network communicates with the UE accordingly.

In 526, UE 106 provides preferred configuration parameters to the base station 102A. The UE may provide these preferred configuration parameters to the cellular network during the RACH (Random Access Channel) communication, in the RRC (radio resource control) signaling with the base station (eNB). Alternatively, the UE may provide these preferred configuration parameters in a special handshaking protocol.

The preferred configuration parameters are desirable for configuring the UE 106 in accordance with the capabilities of UE 106 as a link budget limited device. The preferred configuration parameters may comprise various parameters that specific to a link budget limited device, and are usable to adapt communication between the UE and various base stations. These preferred communication parameters indicate, timer values, criteria, and/or procedures associated with various link budget limited UE operations. The preferred communication parameters are discussed further below with respect to each of these aspects of UE to base station communication. It is noted that the UE indicating that it is link budget limited in 524 may occur in conjunction with (in the same communication) as the provision of preferred configuration parameters in 526.

In some embodiments, the UE may provide the cellular network with an index value that references or specifies a set of preferred configuration parameters, and not the parameters themselves. In these embodiments, the cellular network may store a plurality of sets of different parameters, some for link budget limited UEs, some for normal (non-link budget limited) UEs, and some for different ranges or degrees of link budget constraints. The index value provided by the UE is used by the cellular network to identify the desired set of preferred configuration parameters. For example, the cellular network may store a data structure which contains a mapping of these index values to different sets of pre-stored preferred configuration parameters.

In 528, UE 106 receives communication from the cellular network based on the preferred configuration parameters. In other words, the cellular network may receive the indication that the UE is link budget limited and the preferred configuration parameters and decide to operate (and configure the UE to operate) as the UE has requested. In this instance, the cellular network issues commands to the UE to configure the UE according to all (or perhaps a subset of) the desired configuration parameters. The cellular network may also configure itself to operate based on these preferred configuration parameters. In some instances, the respective base station (or the portion of the cellular network) may not be programmed to be aware of this link budget limited signaling and may ignore the information received in 524 and 526. In these instances, the UE is not configured based on its desired parameters.

Example Preferred Configuration Parameters

The following are example preferred configuration parameters that are modified for a link budget limited device according to some embodiments. In most of the examples below, the UE provides a configuration parameter value that is different than that specified by the relevant RAT standard. Other configuration parameters may be modified, in addition to the ones set out below.

Timers for Handover and Reestablishment

The value of a handover failure timer may be increase to allow for longer handover execution. More specifically, the T304 handover failure timer may be extended to support longer handover execution because of the limited link budget of the UE. The T304 is an LTE timer which begins at the receipt of an RRC (Radio Resource Control) Connection Reconfiguration message along with Mobility Control information. The T304 timer may also start at the receipt of mobility information from an E-UTRA command message, which may include a cell change order. At expiry of the T304 timer, an action may be selectively performed based on the current need. In the case of a Cell Change Order from the E-ETRA or intra E-UTRA handover, the network may initiate the RRC connection re-establishment procedure. In the case of handover to E-UTRA, the network may perform actions per the source RAT.

The Time to Trigger (TTT) parameter may be extended to save power and to limit failure of measurement reports (especially in the case of mobility). The TTT parameter is the length of time (TTT window) between when a measurement is begun and the actual measurement report is provided to the cellular network which handover is prevented from occurring. Increasing the length of the TTT timer may operate to prevent a ping-pong effect between handovers.

The handover preparation time may be defined as the time from a measurements report to a handover trigger. In some embodiments, the handover preparation time may be increased to take into account the link budget limitations of the UE device.

Figure 7:
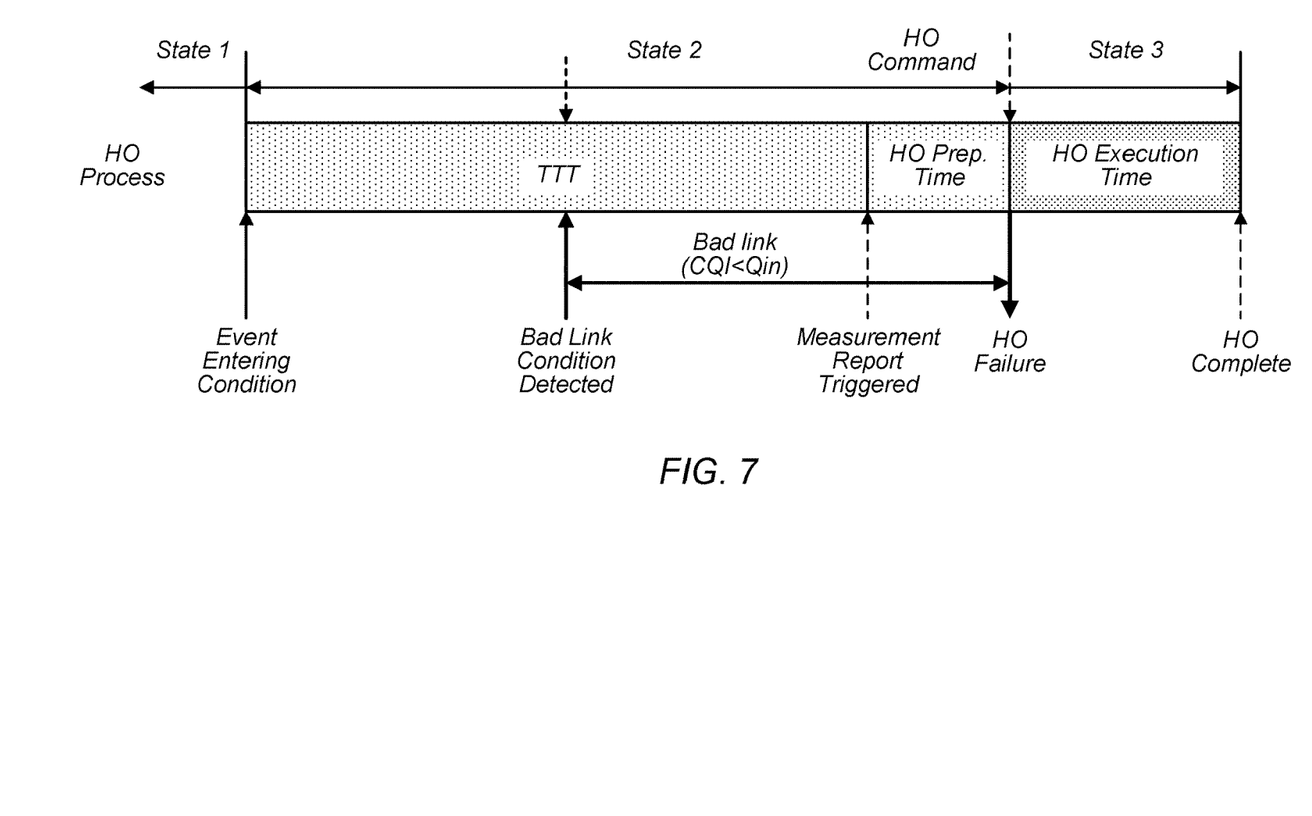
FIG. 7 illustrates operation of various timers for handover and reestablishment, according to some embodiments.

FIG. 7—Timers for Handover and Reestablishment

FIG. 7 illustrates operation of various timers for handover and reestablishment, according to some embodiments. As shown, a handover process may be ongoing in State 1, and an event entering condition may occur as shown.

The TTT period shown in FIG. 7 is longer than that specified in the RAT standard, i.e., the length of the TTT period timer has been extended by one of the preferred configuration parameters requested by the UE. After the TTT period, the UE may send the measurement reports to the eNB. Measurement Events A2, A3, and/or A4 could be used to provide an indication of UE coverage to the network.

As described above, a link budget limited UE may use SINR values instead of, or supplemental to, RSRP/RSRQ values in determining when handover should occur. In order to trigger the measurement reports, the UE may perform a mapping of measured SINR values (or thresholds) to adjust RSRP/RSRQ values that are reported to the cellular network. The latter will trigger the A2/3/4 measurement reports. The event A3 indicates that, as between neighboring cells, one cell is relatively better than the rest. At the edge of a cell with a link budget limited device, the event A3 may be difficult or impossible to establish because all neighboring cells may be out of range due to the link budget constraints of the device. The event A4 indicates that signal between the UE and a particular cell exceeds a threshold value. Because of the link budget gap for these specific devices, the event A4 may be the most suitable event for handover management. A link budget limited device may thus request an A4 configuration from the eNB in the configuration parameters requested in 606 of FIG. 6.

Radio Link Failure Procedure

In some embodiments, the radio link failure procedure may be relaxed in order to avoid excessive connection interruptions. The Radio Link Failure (RLF) procedure is based on the LTE T310 and N310/N311 timers. The N310 timer essentially counts the number of lost packets, and the N311 timer essentially counts the number of successful decodings or reception for the UE to be deemed back in synch with the eNB.

More specifically, the N310 parameter indicates the number of 200 ms intervals when the UE is unable to successfully decode the PDCCH (Physical Downlink Control Channel) due to low RSRP detected. In other words, the N310 parameter indicates the number of times in which the UE cannot successfully decode 20 consecutive frames in the downlink. The T310 is a timer used to allow the UE to get back in synchronization with the eNB. The N311 parameter indicates the number of 100 ms intervals that the UE should successfully decode the PDCCH to be back in synchronization with the eNB. That is, the N311 parameter indicates the number of times in which the UE must successfully decode 10 consecutive frames in the downlink in order for the UE to assume the radio link is in synch. If the UE detects N310 consecutive out-of-sync indications, it starts the T310 timer. If the T310 timer expires, the link has failed. If the UE detects N311 consecutive in-sync indications prior to the T310 timer expiring, then the timer is stopped and the link has not failed.

With a link budget limited UE, it is assumed that packets will be lost more often, and thus in some embodiments the N310 counter threshold which triggers the RLF may be increase or extended. In some embodiments, the N311 counter which stops the RLF procedure may be reduced, thus making it easier (or more lenient) for the UE to be considered back in synch with the eNB.

PDCP/RLC/SR/CQI

The link budget limited UE may request to increase the maximum number of RLC (radio link control) retransmissions for radio bearers, including both data radio bearers (DBRs) and signaling radio bearers (SRB), to avoid having a radio link failure (RLF). This may be especially important for SRBs.

A link budget limited UE device may further indicate that a packet discard timer, such as the PDCP discard timer, should be increased in order to avoid dropping packets. Thus, where packets are maintained in a buffer until a successful retransmission occurs, it may be desirable to increase the length of time that packets are allowed to stay in the buffer until they are discarded. This allows packets to remain in the transmission buffer for a longer period of time, which is desirable since the number of retransmission attempts has also been increased as mentioned above. Increasing the PDCP discard timer helps to avoid causing the UE device to restart a communication from the beginning, an event that is triggered when a dropped package threshold is reached.

Furthermore, the maximum number of attempts a UE undertakes in sending a scheduling request (SR) over PUCCH may be reduced. A UE may issue a SR to request uplink resources for a given slot in a particular cell in the network. For example, a link budget limited UE may only undertake 3 or 4 attempts over PUCCH before dropping to RACH because the marginal benefits of each additional attempt past the first 3 or 4 may not outweigh the marginal costs of each additional attempt. In other words, due to the link budget constraints of the UE device, if the UE has not succeeded in requesting uplink resources after 3 or 4 scheduling requests, then it is unlikely further scheduling requests will produce results, i.e., will be received by the cellular network.

A link budget limited may further limit the periodicity of channel quality indicator (CQI) reporting to avoid the resources required for more frequent reporting. Because the UE is link budget limited, the channel quality may in most instances be somewhat constant, and likely somewhat poor, and thus fewer CQI reports are needed. Instead of reporting the CQI every 5 milliseconds (ms), for example, a link budget limited device may report every second or every 100 ms. Of course, the frequency of CQI reporting may also vary based on the current degree of movement (mobility) of the UE as well.

RACH Attempts

In current cellular networks, the UE is configured with a maximum number of RACH attempts. However, a UE that is link budget limited (or link budget constrained) is relatively more likely to reach the maximum number of RACH attempts. Hence, in some embodiments, the maximum number of RACH attempts with which the UE is configured may be increased in order to limit the resource-intensive Out of Service (OOS) procedure. The UE may thus request a RACH attempt value that operates to delay the OOS procedure as much as possible. In the worst case, if the UE is till not able to successfully perform a RACH to an eNB, it can declare the respective eNB barred internally and may attempt to perform a subsequent RACH procedure with a different eNB.

Thus preferred configuration parameters requested by the link budget limited UE may include new RRC thresholds for events A1/A2/A3/A4; a new PDCP discard timer value; new UL max retransmission threshold; CQI transmission frequency, RACH parameters (e.g., numberofRA-Preambles, powerRampingStep, preambleInitialReceivedTargetPower, preambleTransMax, maxHARQ-Msg3Tx, and dedicated PRACH resources); and various timers and constants (e.g., T300, T301, T310, N310, N311, and N311).

Other examples of configuration parameters requested by a link budget limited UE, as discussed above, may include: new C-DRX parameters; a Bearer Resource Modification Request requesting a Quality of service Class Identifier (QCI) of, e.g., 6, 7, or 8; and certain GBR (guaranteed bit rate) parameters, which may map to a C-DRX configuration, and which may be based on whether a foreground or background application is running on the UE.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
at least one antenna;
a radio coupled to the at least one antenna for performing wireless cellular communications;
at least one processing element coupled to the radio;
wherein the at least one processing element is configured to cause the UE to:
connect to a base station in a first cell in a cellular network;
perform a measurement of received signal power from the base station, wherein the measurement of received signal power produces a first received signal power value;
perform a measurement of signal to interference noise ratio (SINR) of communications received by the UE in the first cell;
adjust the first received signal power value based on the SINR measurement to produce a second received signal power value, wherein the second received signal power value is different than the first received signal power value; and
communicate the second received signal power value to the base station as the received signal power measurement, wherein the second received signal power value is used by the base station in determining when a handover of the UE should occur from the first cell to a second cell.

2. The UE of claim 1,
wherein, in adjusting the first received signal power value based on the SINR measurement, the UE is configured to add an offset to the first received signal power value to produce the second received signal power value, wherein an amount of the offset corresponds to an amount of the SINR measurement.

3. The UE of claim 1,
wherein when the SINR measurement is larger, the UE is configured to report a correspondingly larger second received signal power value as the received signal power measurement;
wherein the larger the SINR measurement the less likely the second received signal power value communicated to the base station will trigger a handover from the first cell to the second cell.

4. The UE of claim 1,
wherein the UE is configured to communicate with the cellular network according to a first cellular radio access technology (RAT), wherein the first cellular RAT specifies that the UE report a measurement of received signal power to the cellular network for use in determining whether to handover the UE from the first cell to the second cell.

5. The UE of claim 1, wherein for larger SINK measurements, the UE is configured to report correspondingly larger second received signal power values as the received signal power measurement.

6. The UE of claim 1, wherein the measurement of the received signal power comprises a reference signal received power (RSRP) measurement.

7. The UE of claim 1, wherein the UE comprises a link budget limited device.

8. An apparatus for configuration in a user equipment (UE), comprising:
at least one processing element, wherein the at least one processing element is configured to cause the UE to:
connect to a base station in a first cell in a cellular network;

perform a measurement of received signal power from the base station, wherein the measurement of received signal power produces a first received signal power value;

perform a measurement of signal to interference noise ratio (SINR) of communications received by the UE in the first cell;

adjust the first received signal power value based on the SINR measurement to produce a second received signal power value, wherein the second received signal power value is different than the first received signal power value; and communicate the second received signal power value to the base station as the received signal power measurement, wherein the second received signal power value is used by the base station in determining when a handover of the UE should occur from the first cell to a second cell.

9. The apparatus of claim 8,
wherein adjusting the first received signal power value based on the SINR measurement comprises adding an offset to the first received signal power value to produce the second received signal power value, wherein an amount of the offset corresponds to an amount of the SINR measurement.

10. The apparatus of claim 8,
wherein when the SINR measurement is larger, the UE is configured to report a correspondingly larger second received signal power value as the received signal power measurement;
wherein the larger the SINR measurement the less likely the second received signal power value communicated to the base station will trigger a handover from the first cell to the second cell.

11. The apparatus of claim 8,
wherein the UE is configured to communicate with the cellular network according to a first cellular radio access technology (RAT), wherein the first cellular RAT specifies that the UE report a measurement of received signal power to the cellular network for use in determining whether to handover the UE from the first cell to the second cell.

12. The apparatus of claim 8, wherein for larger SINR measurements, the second received signal power value is correspondingly larger.

13. The apparatus of claim 8, wherein the measurement of the received signal power comprises a reference signal received quality (RSRQ) measurement.

14. A method for operating a user equipment (UE), comprising:
at the UE:
communicating with a base station in a first cell in a cellular network;
performing a measurement of received signal power from the base station, wherein the measurement of received signal power produces a first received signal power value;
performing a measurement of signal to interference noise ratio (SINR) of communications received by the UE in the first cell;
adjusting the first received signal power value based on the SINR measurement to produce a second received signal power value, wherein the second received signal power value is different than the first received signal power value; and
communicating the second received signal power value to the base station as the received signal power measurement, wherein the second received signal power value is used by the base station in determining when a handover of the UE should occur from the first cell to a second cell.

15. The method of claim 14,
wherein, said adjusting the first received signal power value based on the SINR measurement comprises adding an offset to the first received signal power value to produce the second received signal power value, wherein an amount of the offset corresponds to an amount of the SINR measurement.

16. The method of claim 14,
wherein when the SINR measurement is larger, the UE is configured to report a correspondingly larger second received signal power value as the received signal power measurement;
wherein the larger the SINR measurement the less likely the second received signal power value communicated to the base station will trigger a handover from the first cell to the second cell.

17. The method of claim 14,
wherein said communicating with the base station is performed according to a first cellular radio access technology (RAT), wherein the first cellular RAT specifies that the UE report a measurement of received signal power to the cellular network for use in determining whether to handover the UE from the first cell to the second cell.

18. The method of claim 14, wherein for larger SINR measurements, the second received signal power value is correspondingly larger.

19. The method of claim 14, wherein the measurement of the received signal power comprises a reference signal received power (RSRP) measurement.

20. The method of claim 14, wherein the UE comprises a link budget limited device.

* * * * *

UNITED STATES PATENT AND TRADEMARK OFFICE
CERTIFICATE OF CORRECTION

PATENT NO. : 10,057,823 B2
APPLICATION NO. : 15/153676
DATED : August 21, 2018
INVENTOR(S) : Tarik Tabet et al.

Page 1 of 1

It is certified that error appears in the above-identified patent and that said Letters Patent is hereby corrected as shown below:

In the Claims

Claim 5, Column 18, Lines 53, please delete "The UE of claim 1, wherein for larger SINK" and insert --The UE of claim 1, wherein for larger SINR--.

Signed and Sealed this
Twenty-first Day of April, 2020

Andrei Iancu
*Director of the United States Patent and Trademark Office*